United States Patent [19]

Davis et al.

[11] Patent Number: 5,018,486

[45] Date of Patent: May 28, 1991

[54] PRESSURE RELIEF SYSTEM FOR A CHECK VALVE

[75] Inventors: Richard S. Davis, Romeo; Jordan R. Lee, Sterling Heights; Glen R. MacFarlane, Clarkston, all of Mich.

[73] Assignee: General Motors Corporation, Detroit, Mich.

[21] Appl. No.: 534,985

[22] Filed: Jun. 8, 1990

[51] Int. Cl.$^5$ .......................................... F02M 35/10
[52] U.S. Cl. .......................................... 123/52 MF
[58] Field of Search ......... 123/52 M, 52 MV, 52 MB, 123/52 MF, 52 ML, 52 MC

[56] References Cited

U.S. PATENT DOCUMENTS

| | | | |
|---|---|---|---|
| 3,810,454 | 5/1974 | Hunt | 123/587 |
| 3,935,842 | 2/1976 | Ishizawa et al. | 123/52 MF |
| 4,232,641 | 11/1980 | Curtil | 123/76 |
| 4,445,336 | 5/1984 | Inoue | 60/605 |
| 4,773,358 | 9/1988 | Heath | 123/52 MF |
| 4,796,584 | 1/1989 | Goto et al. | 123/403 |
| 4,890,582 | 1/1990 | Schatz et al. | 123/26 |

FOREIGN PATENT DOCUMENTS

| | | | |
|---|---|---|---|
| 3417526 | 5/1985 | Fed. Rep. of Germany | 123/52 MF |
| 3714049A1 | 11/1987 | Fed. Rep. of Germany | |
| 0160514 | 9/1983 | Japan | 123/52 MF |

Primary Examiner—David A. Okonsky
Attorney, Agent, or Firm—Gordon F. Belcher

[57] ABSTRACT

A pressure relief system is for an engine having an intake passage leading to a cylinder, a check valve in the intake passage to allow fluid flow toward the cylinder and obstruct fluid back-flow in the reverse direction, and a bypass port located on the intake passage so that the bypass port communicates with a downstream portion defined by the portion of the intake passage between the cylinder and check valve. The pressure relief system comprises a pressure relief passage connected between the bypass port and a reservoir enabling communication between the reservoir and downstream portion. A pressure-sensitive valve is connected to the pressure relief passage. The pressure-sensitive valve allows the communication if the pressure in the downstream portion exceeds a reference pressure by a predetermined amount, and obstructs the communication if the pressure in the downstream portion does not exceed the reference pressure by the predetermined amount.

6 Claims, 2 Drawing Sheets

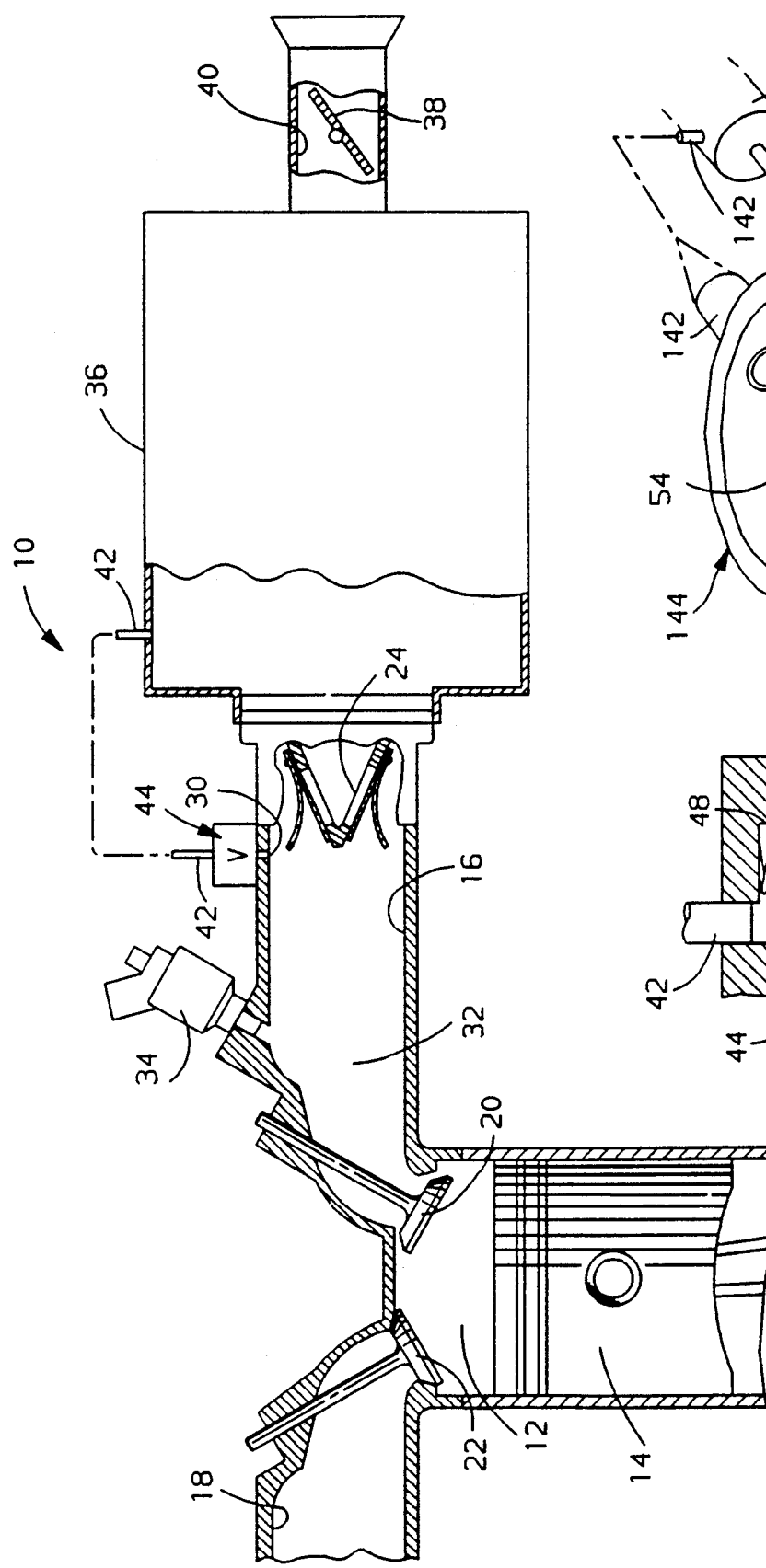

PRESSURE RELIEF SYSTEM FOR A CHECK VALVE

TECHNICAL FIELD

This invention relates to a pressure relief system for a check valve in an intake passage leading to a cylinder in an engine, the pressure relief system allowing venting of the intake passage downstream of the check valve when the pressure in the intake passage exceeds a reference pressure by a predetermined amount.

BACKGROUND

A check valve can be located in an intake passage leading to a cylinder of an engine to obstruct flow of fluid out of the cylinder back into the intake passage. Such fluid back-flow into the intake passage can cause the pressure therein to increase since such fluid back-flow is obstructed by the check valve. During ordinary operation, it may be desirable to maintain this increased pressure in the intake passage since it can resist further fluid back-flow out of the cylinder.

One factor considered in the construction of a check valve is the maximum pressure of the fluid back-flow since it is desirable that the check valve be capable of withstanding such a pressure. This maximum pressure can occasionally be quite high, such as during a backfire.

Constructing a check valve capable of withstanding high pressures can detract from other aspects of the check valve. For example, such a check valve can comprise a reed valve. Increasing the thickness of the petal of a reed valve can increase the ability of the reed valve to withstand high pressures. But, increasing the thickness of the petal can result in a higher mass and stiffness of the petal, which can increase the stress in the petal and the resistance of the petal to fluid flow toward the cylinder.

SUMMARY OF THE INVENTION

The present invention provides a pressure relief system for an engine having a cylinder, an intake passage leading to the cylinder, and a check valve in the intake passage to allow fluid flow toward the cylinder and obstruct fluid back-flow in the reverse direction. A bypass port is located on the intake passage so that the bypass port communicates with a downstream portion defined by the portion of the intake passage between the cylinder and check valve.

The pressure relief system comprises a pressure relief passage connected between the bypass port and a reservoir enabling communication between the reservoir and downstream portion. The pressure relief system further comprises a pressure-sensitive valve connected to the pressure relief passage. The pressure-sensitive valve allows the communication if the pressure in the downstream portion exceeds a reference pressure by a predetermined amount, and obstructs the communication if the pressure in the downstream portion does not exceed the reference pressure by the predetermined amount.

The pressure relief system limits the pressure in the trapped volume to a pressure which does not exceed the reference pressure by the predetermined amount. The maximum pressure which the check valve must withstand can thereby be reduced by selecting a pressure relief system having a sufficiently low reference pressure and predetermined amount. Thus, if the check valve comprises a reed valve, the required thickness of the petal can be reduced resulting in the petal having less mass, stress and stiffness, and less resistance to fluid flow toward the cylinder.

These and other features and advantages of the invention will be more fully understood from the following description of certain specific embodiments of the invention taken together with the accompanying drawings.

BRIEF DRAWING DESCRIPTION

In the drawings:

FIG. 1 is a schematic view showing the pressure relief system for a check valve of the present invention connected to an engine;

FIG. 2 is a sectional view showing details of the pressure-sensitive valve shown schematically in FIG. 1;

FIG. 3 is a perspective view showing an alternative embodiment of the pressure-sensitive valve shown schematically in FIG. 1.

Corresponding reference characters indicate corresponding parts throughout the several views of the drawings.

DETAILED DESCRIPTION

Figure 4:
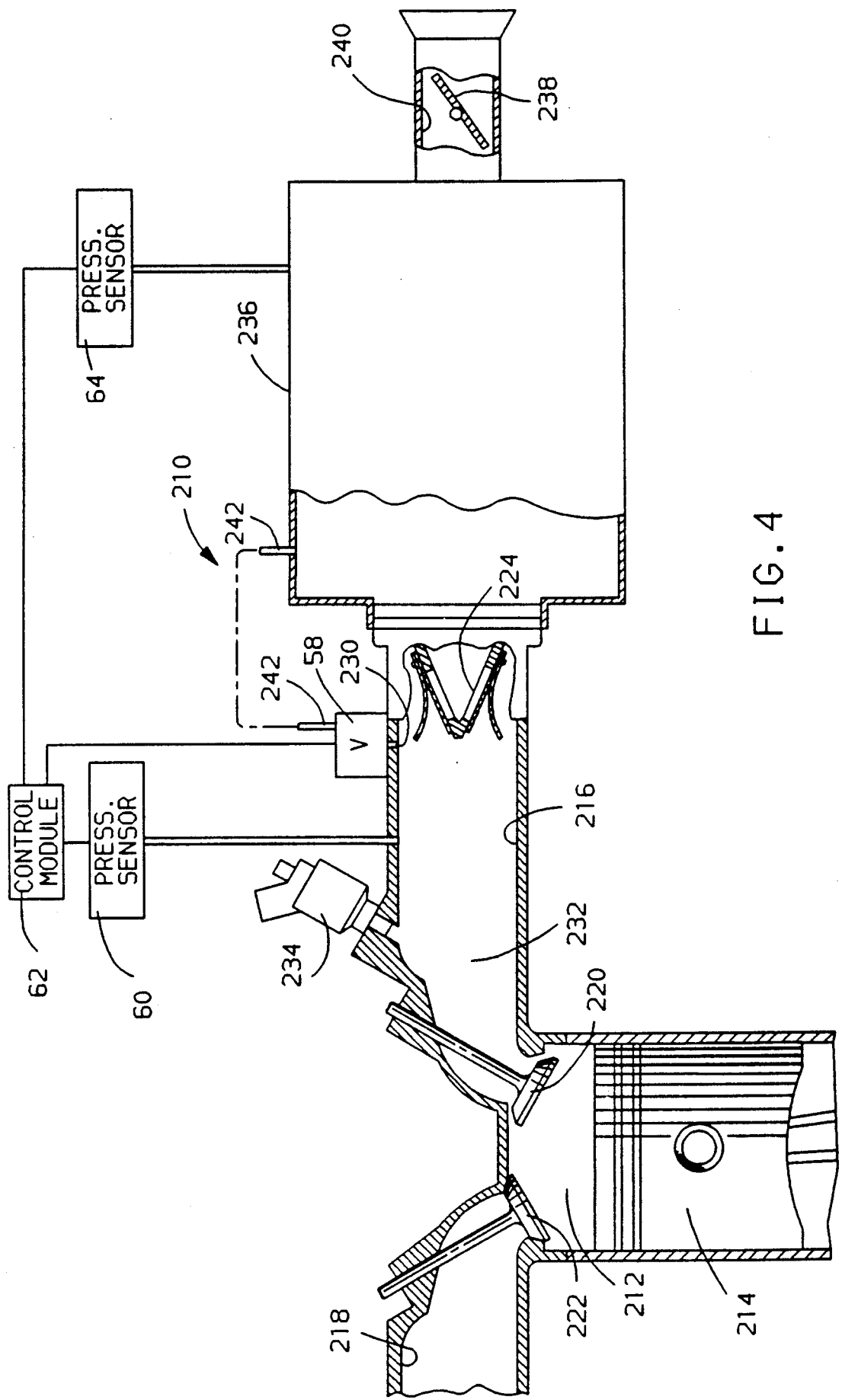
FIG. 4 is a schematic view showing an alternative embodiment of the pressure relief system for a check valve connected to an engine.

Referring now to the drawings in detail, and in particular, FIG. 1, numeral 10 generally refers to a pressure relief system for a check valve 24 of the present invention connected to an engine. The intake bypass system 10 may be used with four-stroke, two-stroke, diesel, rotary valve and rotary engines.

The engine includes a piston 14 disposed in a cylinder 12, an intake passage 16 leading to the cylinder and an exhaust passage 18 leading away from the cylinder. The check valve 24, such as a reed valve, is located in the intake passage 16 to allow fluid flow toward the cylinder 12 and obstruct fluid back-flow in the reverse direction.

An intake valve 20 is seated in the intake passage 16 between the check valve 24 and cylinder 12. The pressure relief system 10 may also be used with an engine which lacks an intake valve 20 as long as the engine has some means for sealing the cylinder 12 from the intake passage 16 during a predetermined portion of the engine cycle (e.g., during combustion in the cylinder). An exhaust valve 22 is seated in the exhaust passage 18.

A bypass port 30 is located on the intake passage 16 so that the bypass port communicates with a downstream portion 32 defined by the portion of the intake passage between the cylinder 12 and check valve 24.

A fuel injector 34 is connected to the downstream portion 32 to inject fuel therein. The fuel injector 34 can have other locations. Also, fuel can be supplied by other means, such as a carburetor. A plenum 36 is connected to the inlet of the intake passage 16 and a throttle valve 38 is located in a throttle passage 40 leading to the plenum. The throttle valve 38 can have other locations. The pressure relief system 10 may also be used with an engine which lacks a throttle valve 38.

The pressure relief system 10 has a pressure relief passage 42 connected between the bypass port 30 and a reservoir enabling communication between the reservoir and downstream portion. In the embodiment shown, the reservoir comprises the plenum 36. The other end of the pressure relief passage 42 may also be directly open to the ambient air which would thereby constitute the reservoir.

A pressure-sensitive valve, comprising a preloaded check valve 44, is connected to the pressure relief passage 42. The preloaded check valve 44 communicates with the downstream portion 32 and plenum 36 so that any pressure difference across the preloaded check valve is approximately equal to the difference between the pressures in the downstream portion and reservoir. Any pressure difference across the preloaded check valve 44 constitutes the check valve pressure difference. The preloaded check valve 44 allows the communication if the check valve pressure difference exceeds a predetermined amount. This allows venting of the downstream portion 32 through the pressure relief passage 42.

The preloaded check valve 44 obstructs the communication if the check valve pressure difference does not exceed the predetermined amount. This prevents total depressurization of the downstream portion 32 when it is vented. During ordinary engine operation, the preloaded check valve 44 obstructs the communication so that the pressure in the downstream portion 32 can be maintained.

Using the plenum 36 as the reservoir presents a number of advantages. First, the effect of altitude changes on the check valve pressure difference is reduced, since the pressure in the downstream portion 32 and plenum 36 is not substantially affected by changes in altitude. Second, the preloaded check valve 44 allows the communication when the effective pressure in the downstream portion 32 which the check valve 24 must withstand exceeds the predetermined amount. This is due to the approximate equality between the check valve pressure difference and the difference between the pressure in the downstream portion 32 and plenum 36. Third, the communication allowed by the preloaded check valve 44 is minimized since the plenum 36 becomes pressurized during the communication thereby reducing the check valve pressure difference. This pressurization of the plenum 36 can provide support to the check valve 24 in withstanding the pressure in the downstream portion 32. Fourth, the air in the plenum 36 flowing to the cylinder 12 can carry thereto any fluid which is vented to the plenum through the pressure relief passage 42.

Although FIG. 1 shows a single cylinder 12, the pressure relief system 10 can also be used with a multi-cylinder engine. Such a pressure relief system 10 would include an intake passage 16 leading to each cylinder and a check valve 24 in each intake passage so that each cylinder 12 has a respective downstream portion 32. A respective pressure relief passage 42 would communicate with each downstream portion 32 via a respective bypass port 30. The other end of each pressure relief passage 42 would be connected to the reservoir. The other end of each pressure relief passage 42 could alternatively be connected to a single pre-plenum which would be connected to the reservoir. Each pressure relief passage 42 would have a respective pressure-sensitive valve connected thereto.

If the pressure relief system 10 is applied to a multi-cylinder engine, each pressure relief passage 42 can also be connected to a common pressure-sensitive valve as long as the portions of the individual pressure relief passages 42 between the respective downstream portions 32 and the common pressure-sensitive valve do not communicate with one another when the pressure-sensitive valve is closed. If the difference between the pressure in a downstream portion 32 and plenum 36 exceeds the predetermined amount, the pressure relief passage 42 connected thereto may communicate with another pressure relief passage so that the excessive pressure is vented to another downstream portion. The connection would preferably be such that the excessive pressure would be vented to a downstream portion 32 through which air is flowing to the adjoining cylinder 12.

One possible embodiment of a preloaded check valve 44 for use with the invention is shown in FIG. 2. The preloaded check valve 44 includes a housing 46 connected to the pressure relief passage 42 so that flow therethrough travels through the housing. Contained in the housing 46 is a flexible member comprising a spring 48 which urges a ball 50 against the bypass port 30. This obstructs flow through the bypass port 30 into the housing 46 to facilitate maintenance of the pressure in the downstream portion 32. The check valve pressure difference is the difference between the pressure upstream of the ball 50 (which is approximately equal to the pressure in the downstream portion 32) and downstream of the ball (which is approximately equal to the pressure in the plenum 36). If the check valve pressure difference exceeds the predetermined amount, the spring 48 deflects allowing displacement of the ball away from the bypass port 30 and venting of the downstream portion 32. Connection of the pressure relief passage 42 to an air source different from the plenum 36 can alter the pressure downstream of the ball 50 and thereby change the check valve pressure difference at which displacement of the ball is desired to vent the downstream portion 32. This can require a different spring 48 which exerts a different force on the ball 50.

Preferably, the spring 48 is constructed so that a relatively small increase in the check valve pressure difference above the predetermined amount produces a substantial deflection of the spring. This enables the ball 50 to rapidly displace away from the bypass port 30 and allow quick venting of the downstream portion 32. If the check valve pressure difference is not greater than the predetermined amount, the spring 48 urges the ball against the bypass port 30. This obstructs further venting of the downstream portion 32 through the bypass port 30 and enables retention of any remaining pressure in the downstream portion.

A second embodiment of the preloaded check valve 144 is shown in FIG. 3. Parts similar to those shown in FIGS. 1 and 2 have the same reference numeral with the addition of the prefix 100. The preloaded check valve 144 includes a housing 52 connected to the pressure relief passage 142 so that flow therethrough travels through the housing. Contained in the housing 52 is a flexible member comprising a torsion member 54 which urges a flap 56 to a closed position against the bypass port 130, as shown in FIG. 3. This obstructs flow through the bypass port 130 into the housing 52 to facilitate maintenance of the pressure in the downstream portion 132. The check valve pressure difference is the difference between the pressure upstream of the flap 56 (which is approximately equal to the pressure in the downstream portion 132) and downstream of the flap (which is approximately equal to the pressure in the plenum 136). If the check valve pressure difference exceeds the predetermined amount, the torsion member 54 twists allowing the flap 56 pivot to an open position to uncover the bypass port 130 and/the downstream portion 132 to be vented. Connection of the pressure relief passage 142 to an air source different from the plenum 136 can alter the pressure downstream of the flap 56 and thereby change the check valve pressure difference at which displacement of the flap from the closed position to vent the downstream portion 132. This can require a different torsion member 54 which exerts a different force on the flap 56.

Preferably, the torsion member 54 is constructed so that a relatively small increase in the check valve pressure difference above the predetermined amount produces a substantial angular deflection of the torsion member from the closed position. This enables the flap 56 to rapidly uncover the bypass port 130 and allow quick venting of the downstream portion 132. If the check valve pressure difference is not greater than the predetermined amount, the torsion member 54 urges the flap 56 to the closed position against the bypass port 130. This obstructs further venting of the downstream portion 132 through the bypass port 130 and enables retention of any remaining pressure in the downstream portion.

An alternative embodiment of the pressure relief system 210 is shown in FIG. 4. Parts similar to those shown in FIG. 1 have the same reference numeral with the addition of the prefix 200. In this embodiment, the pressure-sensitive valve comprises a control valve 58. A pressure sensor 60 is connected to the downstream portion 232 to sense the pressure therein. The pressure sensor 60 produces a downstream signal proportional to the pressure in the downstream portion 232. The control valve 58 may comprise an electrically, hydraulically, or electro-hydraulically operated solenoid valve.

A control module 62 is connected to the pressure sensor 60 and control valve 58. The control module 62 is adapted to sense the downstream signal and cause the control valve 58 to allow communication between the downstream portion 232 and plenum 236 if the downstream signal is of a type that results from the pressure in the downstream portion 232 exceeding a reference pressure by a predetermined amount. The control module 62 is further adapted to cause the control valve 58 to obstruct the communication if the downstream signal is of a type that results from the pressure in the downstream portion 232 not exceeding the reference pressure by the predetermined amount. This allows venting through the pressure relief passage 242 of any pressure in the downstream portion 232 exceeding the reference pressure by the predetermined amount, and enables retention of any remaining pressure in the downstream portion. During ordinary engine operation, the control module 62 causes the control valve 58 to obstruct the communication so that the pressure in the downstream portion 232 is maintained.

The control module 62 can also be connected to a pressure sensor 64 connected to the plenum 236 which senses the pressure therein and produces a plenum signal proportional to the pressure in the plenum. The control module 62 can be further adapted to sense the plenum signal and adjust the reference pressure in proportion to the plenum signal. Since the control module 62 controls communication between the downstream portion 232 and plenum 236, via the pressure relief passage 242, based on a comparison between the downstream signal and reference pressure, the comparison made by the control module is effectively a comparison between the pressure in the downstream portion and plenum. The difference between the pressure in the downstream portion 232 and plenum 236 is equal to the check valve pressure difference. This results in the control valve 58 allowing the communication when the effective pressure in the downstream portion 232 which the check valve 224 must withstand exceeds the predetermined amount.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A pressure relief system for an engine having an intake passage leading to a cylinder, a check valve in the intake passage to allow fluid flow toward the cylinder and obstruct fluid back-flow in the reverse direction, and a bypass port located on the intake passage so that the bypass port communicates with a downstream portion defined by the portion of the intake passage between the cylinder and check valve, the pressure relief system comprising a pressure relief passage connected between the bypass port and a reservoir enabling communication between the reservoir and downstream portion, and a preloaded check valve connected to said pressure relief passage so that any pressure difference across said preloaded check valve is approximately equal to the difference between the pressure in the downstream portion and reservoir, the pressure difference across said preloaded check valve constituting the check valve pressure difference, said preloaded check valve comprising a flap and a torsion member, said torsion member being connected to said flap to allow said flap to pivot between a closed position wherein said flap obstructs flow through said pressure relief passage and an open position wherein said flap pivots away from said closed position to allow flow through said pressure relief passage, said torsion member being adapted to twist if said check valve pressure difference exceeds a predetermined amount to allow said flap to pivot to said open positions, said torsion member being further adapted to urge said flap to said closed position if said check valve pressure difference does not exceed said predetermined amount.

2. A pressure relief system as set forth in claim 1, in combination with a reservoir comprising a plenum connected to the intake passage upstream of the check valve.

3. A pressure relief system for an engine having an intake passage leading to a cylinder, a check valve in the intake passage to allow fluid flow toward the cylinder and obstruct fluid back-flow in the reverse direction, and a bypass port located on the intake passage so that the bypass port communicates with a downstream portion defined by the portion of the intake passage between the cylinder and check valve, the pressure relief system comprising:

a pressure relief passage connected between the bypass port and a reservoir enabling communication between the reservoir and downstream portion, and a pressure-sensitive valve connected to said pressure relief passage, said pressure-sensitive valve allowing said communication if the pressure in the downstream portion exceeds a reference pressure by a predetermined amount, said pressure-sensitive valve obstructing said communication if the pressure in the downstream portion does not exceed said reference pressure by said predetermined amount wherein said pressure-sensitive valve comprises a control valve connected to said pressure relief passage, the pressure relief system further comprising a pressure sensor connected to the downstream portion and adapted to produce a downstream signal proportional to the pressure therein, and a control module connected to said pressure sensor and said control valve, said control module being adapted to sense said downstream signal and cause said control valve to allow said communication if said downstream signal is of a type that results from the pressure in the downstream portion exceeding said reference pressure by said predetermined amount, said control module being further adapted to cause said control valve to obstruct said communication if said downstream signal is of a type that results from the pressure in the downstream portion not exceeding said reference pressure by said predetermined amount.

4. A pressure relief system for an engine as set forth in claim 3, in combination with a reservoir comprising a plenum connected to the intake passage upstream of the check valve, and further comprising a pressure sensor connected to said plenum and adapted to produce a plenum signal proportional to the pressure in said plenum, said control module being further adapted to sense said plenum signal and adjust said reference pressure in proportion to said plenum signal.

5. A pressure relief system for an engine having an intake passage leading to a cylinder, a check valve in the intake passage to allow fluid flow toward the cylinder and obstruct fluid back-flow in the reverse direction, a plenum connected to the intake passage upstream of the check valve, and a bypass port located on the intake passage so that the bypass port communicates with a downstream portion defined by the portion of the intake passage between the cylinder and check valve, the pressure relief system comprising a pressure relief passage connected between the bypass port and plenum enabling communication between the plenum and downstream portion, and a preloaded check valve connected to said pressure relief passage so that any pressure difference across said preloaded check valve is approximately equal to the difference between the pressure in the downstream portion and plenum, the pressure difference across said preloaded check valve constituting the check valve pressure difference, said preloaded check valve comprising a flap and a torsion member, said torsion member being connected to said flap to allow said flap to pivot between a closed position wherein said flap obstructs flow through said pressure relief passage and an open position wherein said flap pivots away from said closed position to allow flow through said pressure relief passage, said torsion member being adapted to twist if said check valve pressure difference exceeds a predetermined amount to allow said flap to pivot to said open position, said torsion member being further adapted to urge said flap to said closed position if said check valve pressure difference does not exceed said predetermined amount.

6. A pressure relief system for an engine having an intake passage leading to a cylinder, a check valve in the intake passage to allow fluid flow toward the cylinder and obstruct fluid back-flow in the reverse direction, and a bypass port located on the intake passage so that the bypass port communicates with a downstream portion defined by the portion of the intake passage between the cylinder and check valve, the pressure relief system comprising a pressure relief passage connected between the bypass port and a reservoir enabling communication between the reservoir and downstream portion, a control valve connected to said pressure relief passage, a pressure sensor connected to the downstream portion and adapted to produce a downstream signal proportional to the pressure therein, and a control module connected to said pressure sensor and control valve, said control module being adapted to sense said downstream signal and cause said control valve to allow said communication if said downstream signal is of a type that results from the pressure in the downstream portion exceeding a reference pressure by a predetermined amount, said control module being further adapted to cause said control valve to obstruct said communication if said downstream signal is of a type that results from the pressure in the downstream portion not exceeding said reference pressure by said predetermined amount.

* * * * *